A. F. WADDELL.
CULINARY UTENSIL.
APPLICATION FILED SEPT. 6, 1907.
930,634.  Patented Aug. 10, 1909.
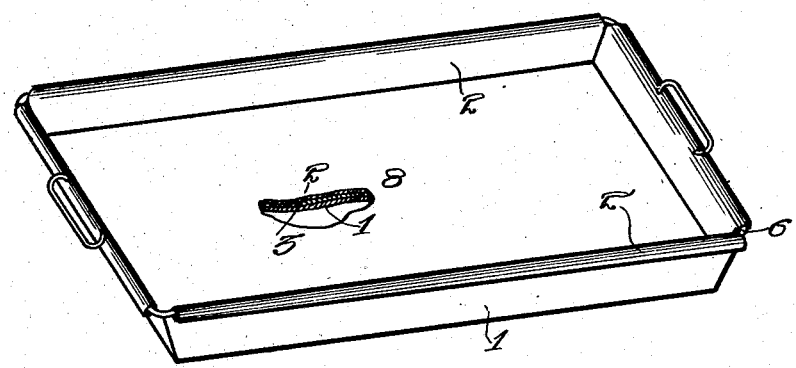
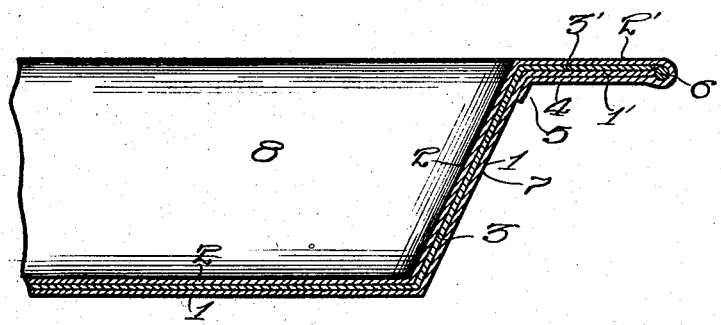
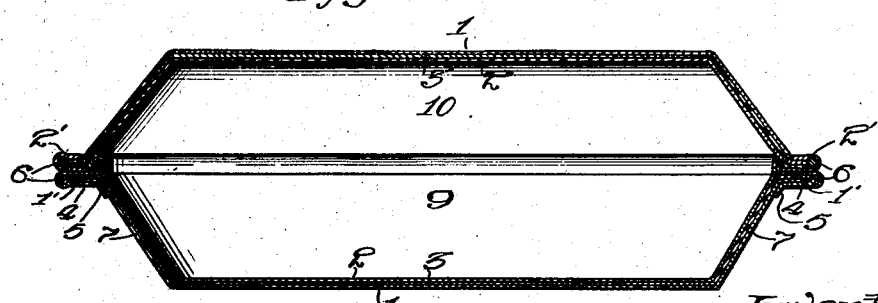
Witnesses:
Inventor
Ada F. Waddell.
by James R. Townsend
her atty.

UNITED STATES PATENT OFFICE.

ADA F. WADDELL, OF LOS ANGELES, CALIFORNIA, ASSIGNOR OF ONE-HALF TO CHARLOTTE B. SHELDON, OF LOS ANGELES, CALIFORNIA.

CULINARY UTENSIL.

No. 930,634.　　　　Specification of Letters Patent.　　　　Patented Aug. 10, 1909.

Application filed September 6, 1907. Serial No. 391,737.

*To all whom it may concern:*

Be it known that I, ADA F. WADDELL, a citizen of the United States, residing at Los Angeles, in the county of Los Angeles and State of California, have invented a new and useful Culinary Utensil, of which the following is a specification.

This invention relates to a pan or other vessel for cooking food such as cake, pies, bread, meat, and vegetables. The same is applicable for use in or on gas and other stoves and ranges and the like.

The invention is more particularly designed for cooking over a gas flame or in an oven heated by gas, and is especially useful for cooking in portable ovens ordinarily used on what is known as a gas plate.

Heretofore, great difficulty has been experienced in baking food in such ovens, the tendency to burn being very great, so that the use of such ovens is generally recognized to be impracticable for general purposes.

The invention consists in constructing a cooking utensil of two flanged nested sheets of metal and a flanged insulating sheet of asbestos paper interposed between the same. Preferably, the three sheets are all nested together, and are bent over to form an outwardly-extending ledge or rim around the top of the wall of the vessel. The inner metal sheet which forms the inside or upper facing of the cooking vessel preferably extends outwardly beyond the rims of the other two sheets, and is lapped under to form the underside of said rim.

The accompanying drawings illustrate the invention in a form I at present deem advisable.

Figure 1 is a view of a pan adapted for baking biscuits, cakes, and the like. Fig. 2 is an exaggerated fragmental section of the pan shown in Fig. 1. Fig. 3 is a cross-section of a covered vessel for baking meat or other articles of food.

1 and 2 are outer and inner dished facing sheets of metal. 3 is an interposed dished sheet of insulating material, as asbestos paper. Each of these sheets is provided with a rim, as 1', 2', 3', respectively. The rim 2' of the inner dished sheet 2, is provided with an under-lap 4 embracing the rims 1' and 3', and may be flanged at the edge, as shown at 5, said flange serving as a bracket to assist in supporting the rim.

6 designates a rim wire extending around the vessel and engaging the edges of the outer sheet 1 and interposed insulating sheet 3, and tightly inclosed by the loop formed between the rim 2' and under-lap 4. Said under-lap preferably extends to the upright wall 7 of the dish 8 to engage the same and exclude moisture from between the external plates 1, 2.

In Fig. 3, the vessel 9 is deeper than the vessel 8 in Fig. 1, and is provided with a cover 10 to indicate that any form of vessel may be constructed in accordance with this invention without departing from the spirit of the same.

The purpose of the insulated rim 4 is to prevent the heat in the oven, which ascends around the bottom of the cooking vessel, from acting too forcibly upon the outside of the bread or other article being cooked in the pan or vessel.

In practice, the pan or vessel will be used in the ordinary manner, but by reason of the insulating sheet, it will be found that the biscuits, cake, bread, and other articles of food may be cooked uniformly throughout in a very superior manner, and if cooked until the top of the biscuits, pie, cake, bread, or the like, becomes browned, it will be found upon removal of the article from the utensil, that the entire surface of the article will be uniformly browned. When thus browned, the cooking will have been fully accomplished, and the vessel may be washed as is common with cooking utensils.

I claim:—

A culinary utensil comprising an outer dished facing sheet of metal having a horizontal rim, a dished sheet of insulating material fitting within the outer sheet and having a horizontal rim fitting the first rim, an inner dished sheet of metal fitting within the insulating material and having a rim corresponding to the rim of the insulating material, under-laps extending from the last-mentioned rim back under the first-mentioned rims, and flanges extending downwardly from the under-laps against the first dished sheet and serving as brackets to assist in supporting the rims.

In testimony whereof, I have hereunto set my hand at Los Angeles California this 28th day of August 1907.

ADA F. WADDELL.

In presence of—
 JAMES R. TOWNSEND,
 JULIA TOWNSEND.